US005780526A

United States Patent [19]

Matsui et al.

[11] Patent Number: 5,780,526
[45] Date of Patent: Jul. 14, 1998

[54] ULTRAVIOLET-CURING LIQUID UNDERCOATING COMPOSITION FOR METALLIZING FRP, COATING METHOD, AND AUTOMOTIVE REFLECTOR

[75] Inventors: Sakae Matsui, Takatsuki; Hiroyuki Nakamura, Yao; Shizuo Kudo, Osaka; Hiroaki Konse, Tokyo, all of Japan

[73] Assignee: Nippon Paint Co., Ltd., Osaka, Japan

[21] Appl. No.: 737,243

[22] PCT Filed: May 23, 1995

[86] PCT No.: PCT/JP95/00984

§ 371 Date: Nov. 14, 1996

§ 102(e) Date: Nov. 14, 1996

[87] PCT Pub. No.: WO95/32250

PCT Pub. Date: Nov. 30, 1995

[30] Foreign Application Priority Data

May 24, 1994 [JP] Japan ................................. 6-135167

[51] Int. Cl.⁶ .................. C08J 3/28; C08L 61/20; C08L 67/08
[52] U.S. Cl. ................. 522/93; 522/96; 522/97; 522/101; 522/103; 522/104; 522/105; 522/107; 522/142
[58] Field of Search ....................... 522/107, 108, 522/104, 93, 101, 142, 96, 97, 105, 103

[56] References Cited

U.S. PATENT DOCUMENTS

| | | | |
|---|---|---|---|
| 3,882,007 | 5/1975 | Watanabe et al. | 522/107 |
| 3,952,032 | 4/1976 | Vrancken et al. | 522/107 |
| 4,148,967 | 4/1979 | Satoh et al. | 522/107 |
| 5,216,047 | 6/1993 | Kato et al. | 523/506 |
| 5,256,446 | 10/1993 | Bogen | 522/121 |
| 5,391,399 | 2/1995 | Cobbledick et al. | 427/370 |

*Primary Examiner*—Susan W. Berman
*Attorney, Agent, or Firm*—Pollock, Vande Sande & Priddy

[57] ABSTRACT

An ultraviolet-curing liquid undercoating composition for use in metallizing FRP, which is a one-component type, has an unlimited pot life, and is excellent in adhesion and heat resistance. The composition comprises 20 to 80 parts by weight of a compound(s) containing at least two (meth) acryloyl groups in its molecule, 80 to 20 parts by weight of oil-modified alkyd resin(s), and 2 to 15 parts by weight of a sensitizer, optionally further 5 to 20 parts by weight of an amino resin based on 100 parts by weight in total of the above compound and the above alkyd resin(s). It is suited for the undercoating of an automotive reflector.

12 Claims, No Drawings

ULTRAVIOLET-CURING LIQUID
UNDERCOATING COMPOSITION FOR
METALLIZING FRP, COATING METHOD,
AND AUTOMOTIVE REFLECTOR

TECHNICAL FIELD

The present invention relates to an ultraviolet-curing liquid undercoating composition for metallizing FRP which is of the one-component type and therefore without pot life restriction, and has excellent adhesion and heat resistance characteristics, a coating method using the undercoating composition, and an automotive reflector as coated by the method.

BACKGROUND TECHNOLOGY

Fiber-reinforced plastics (hereinafter referred to briefly as FRP) are not only light-weight but also highly resistant to corrosion and impact and, therefore, find application in a broad spectrum of uses including automotive reflectors. An automotive reflector, for instance, is manufactured by molding an FRP to the required shape and depositing an aluminum or other metal on the surface of the molding by the vapor deposition technique. However, when a metal such as aluminum is directly vapor-deposited on an FRP article, the brilliance of the metal is sacrificed so that the optical characteristics required of a reflector are hardly obtained. To improve the optical characteristics, therefore, it is by now a common practice to apply an under coat to the surface of the article and allow the coat to cure before the metal vapor deposition step.

As the under coat for such purposes, lacquers using acrylic resin or nitrocellulose, urethane resin coatings, alkyd resin coatings, and ultraviolet radiation (UV)-curing coatings are known. Among them, UV-curing coatings cure in a very short time and are advantageous in terms of productivity and space saving, thus being preferred as FRP under coats.

As such a UV-curing coating, Japanese Patent Application Hei-5-168048 proposes a composition comprising a compound containing a plurality of (meth)acryloyl groups per molecule, such as dipentaerythritol hexaacrylate, dipentaerythritol pentaacrylate, or the like, and an isocyanurate-type polyisocyanate. In another UV-curing coating system, the technology comprising addition of a silane coupling agent for insuring a necessary film performance has been proposed. However, since these coatings are invariably of the two-component type, the problem of a limited pot life was inevitable. Moreover, they were not as satisfactory as desired in the aspect of heat resistance.

With having been developed in the above state of the art, the present invention has for its object to provide an UV-curing liquid undercoating composition for metallizing FRP, which is of the one-component type, thus being free from the problem of a limited pot life, and insures sufficiently high adhesion and heat resistance.

DISCLOSURE OF THE INVENTION

The present invention essentially resides in an UV-curing liquid undercoating composition for metallizing FRP, which comprises 20 to 80 parts by weight of a compound(s) containing at least two (meth)acryloyl groups per molecule, 80 to 20 parts by weight of oil-modified alkyd resin(s), and 2 to 15 parts by weight of a sensitizer, optionally supplemented with 5 to 20 parts by weight of amino resin based on a combined total of 100 parts by weight of said compound(s) containing at least two (meth)acryloyl groups per molecule and said oil-modified alkyd resin(s).

In another aspect, the present invention is concerned with a coating method using said UV-curing liquid undercoating composition for metallizing FRP and an automotive reflector as coated by said method.

The present invention is now described in detail.

The UV-curing liquid undercoating composition for metallizing FRP according to the present invention (hereinafter referred to sometimes as the composition of the invention) essentially comprises a compound(s) containing at least two (meth)acryloyl groups per molecule, oil-modified alkyd resin(s), and a sensitizer.

The first component of the composition of the present invention is compound(s) containing at least two (meth) acryloyl groups per molecule.

In accordance with the present invention, this compound (s) containing at least two (meth)acryloyl groups polymerizes and cures under the aid of said sensitizer upon exposure to ultraviolet radiation to give an under coat.

The compound(s) containing at least two (meth)acryloyl groups per molecule that can be used in the present invention includes (①) the reaction product of a polyol with (meth) acrylic acid, (②) the urethane acrylate available upon addition reaction of a compound having hydroxy and (meth) acryloyl groups to an isocyanato-terminated compound(s), and (③) the epoxy acrylate available upon reaction of a compound containing at least two epoxy or glycidyl groups per molecule with (meth)acrylic acid.

The above reaction product of a polyol with (meth)acrylic acid (①) is an oligoester acrylate. The polyol includes but is not limited to ethylene glycol, diethylene glycol, triethylene glycol, propylene glycol, dipropylene glycol, polyethylene glycol, trimethylene glycol, polypropylene glycol, tetramethylene glycol, polytetramethylene glycol, 1,2-butanediol, 1,3-butanediol, 1,4-butanediol, 1,5-pentanediol, neopentyl glycol, 1,2-hexylene glycol, 1,6-hexanediol, heptanediol, 1,10-decanediol, cyclohexanediol, 2-butene-1, 4-diol, 3-cyclohexene-1,1-dimethanol, 4-methyl-3-cyclohexene-1,1-dimethanol, 3-methylene-1,5-pentanediol, (2-hydroxyethoxy)-1-propanol, 4-(2-hydroxyethoxy)-1-butanol, 5-(2-hydroxyethoxy)-pentanol, 3-(2-hydroxypropoxy)-1-butanol, 4-(2-hydroxypropoxy)-1-butanol, 5-(2-hydroxypropoxy)-1-pentanol, 1-(2-hydroxyethoxy)-2-butanol, 1-(2-hydroxyethoxy)-2-pentanol, hydrogenated bisphenol A, glycerin, diglycerin, polycaprolactone, 1,2,6-hexanetriol, trimethylolpropane, trimethylolethane, pentanetriol, trishydroxymethylaminomethane, 3-(2-hydroxyethoxy)-1, 2-propanediol, 3-(2-hydroxypropoxy)-1,2-propanediol, 6-(2-hydroxyethoxy)-1,2-hexanediol, 1,9-nonanediol, hydroxypivallic neopentyl glycol, spiroglycol, 2,2-bis(4-hydroxyethoxyphenyl)propane, 2,2-bis(4-hydroxypropyloxyphenyl)propane, pentaerythritol, dipentaerythritol, trimethylolpropane, trishydroxyethyl isocyanulate, di(2-hydroxyethyl)-1-acetoxyethyl isocyanurate, di(2-hydroxyethyl)-2-acetoxyethyl isocyanurate, mannitol, glucose, etc. There can also be mentioned alkylene oxide-modified or lactone-modified polyols available upon addition reaction of said polyols to ethylene oxide, propylene oxide, ε-caprolactone, γ-butyrolactone or the like; hydroxy-terminated polyester-polyols or polyetherpolyols which are available upon condensation reaction between an excess of any of said polyols, and polybasic acids or the corresponding acid anhydrides.

There is no restriction on the polybasic acids or acid anhydrides that can be used. For example, phthalic acid, isophthalic acid, terephthalic acid, trimellitic acid, methylcyclohexenetricarboxylic acid, adipic acid, sebacic acid, azelaic acid, tetrahydrophthalic acid, hexahydrophthalic acid, himic acid, succinic acid, dodecinylsuccinic acid, methylglutaric acid, pimellic acid, malonic acid, maleic acid, fumaric acid, chloromaleic acid, dichloromaleic acid, citraconic acid, mesaconic acid, itaconic acid, tetrahydrophthalic acid, carbic acid, HET acid, aconitic acid, glutaconic acid, etc. and the corresponding acid anhydrides can be mentioned.

The above-mentioned polyol further includes reaction products of a compound(s) containing at least two epoxy or glycidyl groups per molecule with a monobasic acid(s) or monoamine(s).

There is no particular limitation on the compound(s) containing at least two epoxy or glycidyl groups that can be used, thus including but not limited to glycidyl ether epoxy resins containing bisphenol A, bisphenol F, 2,6-xylenol, brominated bisphenol A, phenol-novolac, or other unit; glycidyl ester epoxy resins containing a dimer acid or other unit; glycidyl ester epoxy resins containing an aromatic or heterocyclic amine unit; alicylic epoxy resins; and acrylic resins containing epoxy or glycidyl groups.

There is no particular limitation on the above-mentioned monobasic acid(s), either, thus including but not limited to acetic acid, propionic acid, benzoic acid, lauric acid, stearic acid, butyric acid, and (meth)acrylic acid.

There is no particular limitation, either, on the above-mentioned monoamine(s), thus including monoethylamine, diethylamine, triethylamine, isopropylamine, diisopropylamine, mono-n-butylamine, di-n-butylamine, tri-n-butylamine, mono-2-ethylhexylamine, monobenzylamine, piperidine, morpholine, n-methylmorpholine, n-ethylmorpholine, and cetylmorpholine, among others.

Referring to said urethane acrylate (②) available upon addition reaction of a compound having hydroxy and (meth)acryloyl groups to an isocyanato-terminated compound(s), the isocyanato-terminated compound(s) includes but is not limited to polyisocyanates and the reaction products of polyols mentioned for (①) with polyisocyanates.

Among species of the above compound (②), the compound obtainable by using, as said polyol, the reaction product of a compound(s) containing at least two epoxy or glycidyl groups per molecule with a monobasic acid(s) or monoamine(s) can be prepared typically by reacting a compound containing one isocyanato group per molecule, which is obtainable by reacting a compound containing one hydroxy and (meth)acryloyl group(s) per molecule with a polyisocyanate, with a polyol, which can be obtained by reacting a compound(s) containing at least two epoxy or glycidyl groups per molecule and either monobasic acids or monoamines, to give an urethane-modified epoxy acrylate containing both ester and urethane bonds.

The polyisocyanate mentioned for compound (②) may be any of aliphatic, alicyclic, aromatic, and aromatic-aliphatic compounds and includes diisocyanates such as tolylene diisocyanate, 4,4'-diphenylmethane diisocyanate, xylylene diisocyanate, hexamethylene diisocyanate, lysine diisocyanate, 4,4'-methylenebis(cyclohexylisocyanate), methylcyclohexane-2,4-diisocyanate, methylcyclohexane-2,6-diisocyanate, 1,3-(isocyanatomethyl)cyclohexane, isophorone diisocyanate, trimethylhexamethylene diisocyanate, dimer acid diisocyanate, dianisidine diisocyanate, phenyl diisocyanate, halophenyl diisocyanates, methylene diisocyanate, ethylene diisocyanate, butylene diisocyanate, propylene diisocyanate, octadecylene diisocyanate, 1,5-naphthalene diisocyanate, polymethylenepolyphenylene diisocyanate, triphenylmethane triisocyanate, naphthylene diisocyanate, 3-phenyl-2-ethylene diisocyanate, cumene-2,4-diisocyanate, 4-methoxy-1,3-phenylene diisocyanate, 4-ethoxy-1,3-phenylene diisocyanate, 2,4'-diisocyanatodiphenyl ether, 5,6-dimethyl-1,3-phenylene diisocyanate, 4,4'-diisocyanatodiphenyl ether, benzidine diisocyanate, 9,10-anthracene diisocyanate, 4,4'-diisocyanatobenzyl, 3,3-dimethyl-4,4'-diisocyanatodiphenyl, 2,6-dimethyl-4,4'-diisocyanatodiphenyl, 3,3-dimethoxy-4,4'-diisocyanatodiphenyl, 1,4-anthracene diisocyanate, phenylene diisocyanate, 1,4-tetramethylene diisocyanate, 1,10-decanemethylene diisocyanate, 1,3-cyclohexylene diisocyanate, etc.; cyanurates, biurets, and adducts of said diisocyanates; and triisocyanates such as 2,4,6-tolylene triisocyanate, 2,4,4'-triisocyanatodiphenyl ether, and so on.

The compound having hydroxy and (meth)acryloyl groups mentioned for compound (②) includes pentaerythritol tri(meth)acrylate, dipentaerythritol penta(meth)acrylate, epoxy (meth)acrylate, 2-hydroxyethyl (meth)acrylate, glyceryl di(meth)acrylate, etc., alkylene oxide-modified or lactone-modified compounds available upon addition reaction of said acrylates to ethylene oxide, propylene oxide, ε-caprolactone, γ-butyrolactone, or the like. Furthermore, addition products of a polyisocyanate to the above compounds can also be used.

The compound (③) available upon reaction of a compound(s) containing at least two epoxy or glycidyl groups per molecule with (meth)acrylic acid is an epoxy acrylate.

The above compound(s) containing at least two epoxy or glycidyl groups includes but is not limited to the species containing at least two epoxy or glycidyl groups per molecule as mentioned for compound (②) hereinbefore.

In accordance with this invention, any of the compounds (①) to (③) can be used as the compound(s) containing at least two (meth)acryloyl groups per molecule. These compounds undergo polymerization to cure upon exposure to ultraviolet light due to the unsaturated bonds they contain. If necessary, the composition of the present invention may be further supplemented with other unsaturated compounds such as diallyl fumarate, triallyl isocyanurate, and so on.

In accordance with the present invention, the compound (s) containing at least two (meth)acryloyl groups is preferably a compound(s) containing at least three (meth)acryloyl groups. The compound containing only two (meth)acryloyl groups will not be fully satisfactory in terms of heat resistance.

However, when the composition of the present invention is used in applications not requiring high heat resistance, for example a reflector, even the compound containing only two (meth)acryloyl groups can be used with success. Among the applications other than products requiring heat resistance is the application of the compound of the present invention to an offset-printed paper for protective and decorative purposes.

The compound(s) containing at least three (meth)acryloyl groups includes ((①)-a) the ester of a compound containing 3 or more hydroxyl groups per molecule with (meth)acrylic acid.

The compound containing 3 or more hydroxyl groups per molecule includes but is not limited to pentaerythritol, dipentaerythritol, trimethylolpropane, trimethylolethane, ditrimethylolpropane, glycerin, diglycerin, etc. and alkylene oxide-modified or lactone-modified polyols available upon addition reaction of these compounds to ethylene oxide, propylene oxide, ε-caprolactone, γ-butyrolactone, or the like.

The compound(s) containing at least three (meth)acryloyl groups per molecule further includes (③-a) the ester of a compound containing 3 or more epoxy or glycidyl groups per molecule with (meth)acrylic acid.

The compound containing 3 or more epoxy or glycidyl groups per molecule includes but is not limited to glycerol triglycidyl ether, trimethylolpropane triglycidyl ether, sorbitol tetraglycidyl ether, sorbitol pentaglycidyl ether, sorbitan tetraglycidyl ether, sorbitan pentaglycidyl ether, triglycerol tetraglycidyl ether, tetraglycerol tetraglycidyl ether, pentaglycerol tetraglycidyl ether, triglycerol pentaglycidyl ether, tetraglycerol pentaglycidyl ether, pentaglycerol pentaglycidyl ether, pentaerythritol tetraglycidyl ether, and triglycidyl isocyanurate. In addition, o-cresol novolac epoxy resin which contains 3 or more glycidyl groups can be mentioned.

The above o-cresol novolac epoxy resin which contains 3 or more glycidyl groups includes but is not limited to Sumiepoxy ESCN-220L (Sumitomo Chemical), Sumiepoxy ESCN-220M (Sumitomo Chemical), and Sumiepoxy ESCN-220N (Sumitomo Chemical).

The compound(s) containing at least three (meth)acryloyl groups per molecule further includes (②-a) the urethane-modified (meth)acrylate compound available upon addition reaction between isocyanato-terminated compound(s) and compound(s) containing both hydroxyl and (meth)acryloyl groups and (②-b) the urethane-modified (meth)acrylate compound available upon addition reaction of a compound(s) containing both hydroxyl and (meth)acryloyl groups to isocyanato-terminated compound(s) which is obtainable by reacting polyisocyanate(s) with a hydroxy-terminated polyesterpolyol(s) or polyetherpolyol(s) available upon condensation reaction of an excess of a polyol(s) with polybasic acid(s) or acid anhydride(s) thereof.

Referring to the above compounds (②-a) and (②-b), the isocyanato-terminated compound(s) includes the compounds mentioned by way of example in connection with compound (②) hereinbefore.

Referring to the compound (②-a), the above-mentioned compound containing both hydroxyl and (meth)acryloyl groups include but is not limited to the compounds containing hydroxyl and (meth)acryloyl groups as mentioned for compound (②).

Referring to compound (②), the above-mentioned polyol includes but is not limited to the polyols mentioned for compound (①).

Referring, further, to compound (②-b), the polybasic acids or the acid anhydrides thereof includes but is not limited to the polybasic acids and corresponding acid anhydrides mentioned for compound (①).

The preferred compound(s) containing at least three (meth)acryloyl groups per molecule for the purposes of this invention is the ester of a compound containing 3 or more hydroxy groups per molecule (①-a) with (meth)acrylic acid, particularly the ester of any of pentaerythritol, dipentaerythritol, and ditrimethylolpropane with (meth)acrylic acid.

The composition of the invention contains 20 to 80 parts by weight of said first component, the compound(s) containing at least two (meth)acryloyl groups per molecule. If the proportion is smaller than 20 parts by weight, the product will be not satisfactory enough in gloss and heat resistance. On the other hand, if the limit of 80 parts by weight is exceeded, the product adhesion will be inadequate. The preferred range is 20 to 60 parts by weight.

The second component of the composition of the present invention is oil-modified alkyd resin(s). The oil-modified alkyd resin(s) provides for adhesion to FRP.

There is no particular limitation on the kind of oil-modified alkyd resin(s) that can be used. For example, it may be a resin that can be obtained by using an oil or fatty acid as a modifying agent in addition to said polyhydric alcohol and said polybasic acids or acid anhydrides thereof.

There is no particular limitation on the kind of said polyhydric alcohol, thus including the polyols typically mentioned for compound (①).

There is no particular limitation, either, on the kind of said polybasic acids or acid anhydrides thereof. Thus, the polybasic acids and the corresponding acid anhydrides mentioned for compound (①) can be employed.

The oil or fatty acid that can be used as said modifying agent is not critical in kind and may be any of non-drying, semi-drying and drying oils, such as coconut oil, soybean oil, tall oil, safflower oil, linseed oil, tung oil, castor oil, etc. and fatty acids available from said oils.

In the present invention, the oil length of said oil-modified alkyd resin(s) is not particularly critical and may be any of short-length oil, medium-length oil, and long-length oil. The term "oil length" as used in this specification means the weight percentage of oil content. Specifically, such oil-modified alkyd resin(s) include but are not limited to coconut oil-modified alkyd resins such as Beckosol 1323-60-EL (Dainippon Ink and Chemicals, Inc., oil length 28%) etc., tall oil-modified alkyd resins such as the resin with an oil length of 39% which is described in detail in Reference Example 1, and Beckosol ET-6502-60 (Dainippon Ink and Chemicals, Inc., oil length 65%); soybean-modified alkyd resins such as Beckosol ES-6505-70 (Dainippon Ink and Chemicals, Inc., oil length 65%), Beckosol OD-E-198-50 (Dainippon Ink and Chemicals, Inc., oil length 28%), Beckosol ES-4020-55 (Dainippon Ink and Chemicals, Inc., oil length 40%), Beckosol P-470-70 (Dainippon Ink and Chemicals, Inc., oil length 65%), etc.; safflower oil-modified alkyd resins such as Beckosol J-557 (Dainippon Ink and Chemicals, Inc., oil length 51%) etc.; linseed oil-modified alkyd resins such as Beckosol 45-163 (Dainippon Ink and Chemicals, Inc., oil length 28%), Beckosol EL-4501-50 (Dainippon Ink and Chemicals, Inc., oil length 45%), Beckosol EL-6501-70 (Dainippon Ink and Chemicals, Inc., oil length 65%), and so on.

In practicing the present invention, the oil length for said oil-modified alkyd resin(s) can be freely selected with reference to the application of the invention. However, the oil length of the solids content of the composition of the present invention is preferably not greater than 35%. If the solids content oil length exceeds 35%, the final coat will have a poor appearance and may not be sufficiently resistant to heat. More preferably, the oil length is not greater than 28%.

The oil length of the solids content of the composition of the present invention depends on two factors, namely the oil length of said oil-modified alkyd resin(s) and the formulating ratio of said compound(s) containing at least two (meth)acryloyl groups per molecule to said oil-modified alkyd resin(s). The oil length of said oil-modified alkyd resin(s) depends on the kind of the oil constituting said oil-modified alkyd resin(s).

Assuming that a coconut oil-modified alkyd resin with an oil length of 28% is employed, the oil length of the solids content of the composition of the present invention can be controlled to a more satisfactory value of 14% by using a formulating ratio of 50:50 for said compound(s) containing at least two (meth)acryloyl groups per molecule and said oil-modified alkyd resin.

When a tall oil-modified alkyd resin with an oil length of 39% is employed, the oil length of the solids content of the composition of the present invention can be adjusted to a more satisfactory range of 15.6 to 27.3% by using said compound(s) containing at least two (meth)acryloyl groups per molecule and said oil-modified alkyd resin in a formulating ratio of 30:70 to 60:40.

When a soybean-modified alkyd resin with an oil length of 28% is employed, the oil-length of the solids content of the composition of the invention can be controlled to a more satisfactory range of 14 to 16.8% by using said compound(s) containing at least two (meth)acryloyl groups per molecule and said oil-modified alkyd resin in a formulating ratio of 40:60 to 50:50.

When a soybean oil-modified alkyd resin with an oil length of 40% is employed, the oil length of the solids content of the composition of the present invention can be controlled to a more satisfactory range of 20 to 24.1% by using said compound(s) containing at least two (meth) acryloyl groups per molecule and said oil-modified alkyd resin in a formulating ratio of 40:60 to 50:50.

Furthermore, when a linseed-oil modified alkyd resin with an oil length of 45% is employed, the oil length of the solids content of the composition of the invention can be controlled to a more satisfactory range of 22.5 to 27% by using said compound(s) containing at least two (meth)acryloyl groups per molecule and said oil-modified alkyd resin in a formulating ratio of 40:60 to 50:50.

The composition of the present invention comprises 80 to 20 parts by weight of the above second component, the oil-modified alkyd resin(s). If the limit of 80 parts by weight is exceeded, the heat resistance will be low. If the proportion of the second component is smaller than 20 parts by weight, poor adhesion will result. The preferred proportion is 80 to 40 parts by weight.

The third component of the composition of the present invention is a sensitizer. This sensitizer acts as a photopolymerization initiator.

There is no particular limitation on the kind of sensitizer that can be used. Thus, the sensitizer may be any of benzoin methyl ether, benzoin ethyl ether, benzoin isobutyl ether, benzoin isopropyl ether, benzoin, α-methylbenzoin, benzoin n-butyl ether, 2-ethylanthraquinone, 2-t-butylanthraquinone, 1-chloroanthraquinone, 2-amylanthraquinone, 2-aminoanthraquinone, benzophenone, p-chlorobenzophenone, p-dimethylaminobenzophenone, benzophenone methyl ether, methylbenzophenone, 4,4-dichlorobenzophenone, 4,4-bisdiethylaminobenzophenone, diphenyl sulfide, tetramethylthiuram disulfide, 2,4-dimethylthioxanthone, 2,4-diisopropylthioxanthone, 2,4-diethylthioxanthone, 2-chlorothioxanthone, 2-isopropylthioxanthone, 2,2-dimethoxy-2-phenylacetophenone, α,α-dichloro-4-phenoxyacetone, p-tert-butyltrichloroacetophenone, p-tert-butyldichloroacetophenone, 2,2-diethoxyacetophenone, p-dimethylaminoacetophenone, hydroxycyclohexyl phenyl ketone, 1-(4-isopropylphenyl)-2-hydroxy-2-methylpropan-1-one, 2,2-dimethoxy-1,2-diphenylethan-1-one, 2,4,6-trimethylbenzoindiphenylphosphine oxide, 2-methyl-1-[4-(methylthio)phenyl]-2-morpholinopropan-1-one, 4-(2-acryloxy)oxyethoxyphenyl-2-hydroxy-2-propylketone, 4-(2-hydroxy)phenyl-(2-hydroxy-2-propyl)ketone, bis(2,6-dimethoxybenzoyl)-2,4,4-trimethylphenylphosphine oxide, etc. Of the above sensitizers, 2,4-dimethylthioxanthone, 2,4-diisopropylthioxanthone, 2,4-diethylthioxanthone, 2-chlorothioxanthone, 2-isopropylthioxanthone, hydroxycyclohexylphenyl ketone, 1-(4-isopropylphenyl)-2-hydroxy-2-methylpropan-1-one, 2,2-dimethoxy-1,2-diphenylethan-1-one are preferred in terms of curability, adhesion, and heat resistance. In the present invention, these sensitizers can be used singly or in combination.

The composition of the present invention contains this third component sensitizer in a proportion of 2 to 15 parts by weight based on 100 parts by weight of said first and second components combined. If the proportion of the sensitizer is smaller than 2 parts by weight, adhesion and heat resistance will be inadequate. On the other hand, it would be uneconomical to use more than 15 parts by weight of the third component. The preferred proportion is 3 to 10 parts by weight.

In the practice of the present invention, a further enhancement of heat resistance can be achieved, where necessary, by incorporating an amino resin as a fourth component in addition to said first through third components.

The amino resin that can be used for this purpose includes methylolated amino resins which can be synthesized by using at least one of melamine, urea, and benzoguanamine, and a formaldehyde; and such methylolated amino resins whose methylol groups have been totally or partly etherified with lower monohydric alcohols such as methanol, ethanol, propanol, isopropyl alcohol, butanol, isobutyl alcohol, etc. Specifically, the amino resin includes Cymel 303 (Mitsui Cytek; methylated melamine resin), Cymel 350 (Mitsui Cytek; methylated melamine resin), U-Van 520 (Mitsui Toatsu; n-butylated melamine resin), U-Van 20-SE-60 (Mitsui Toatsu; n-butylated melamine resin), U-Van 2021 (Mitsui Toatsu; n-butylated melamine resin), U-Van 220 (Mitsui Toatsu; n-butylated melamine resin), U-Van 22R (Mitsui Toatsu; n-butylated melamine resin), U-Van 2028 (Mitsui Toatsu; n-butylated melamine resin), U-Van 165 (Mitsui Toatsu; isobutylated melamine resin), U-Van 114 (Mitsui Toatsu; isobutylated melamine resin), U-Van 62 (Mitsui Toatsu; isobutylated melamine resin), U-Van 60R (Mitsui Toatsu; isobutylated melamine resin), and MF-521 Varnish (Nippon Paint Co.; benzoguanamine resin), among others.

The composition of the present invention preferably contains said fourth component, the amino resin in a proportion of 5 to 20 parts by weight based on 100 parts by weight of said first and second components combined. If the proportion is smaller than 5 parts by weight, no sufficient improvement will be obtained in heat resistance. If the limit of 20 parts by weight is exceeded, no further improvement will be realized and adhesion will be rather decreased. The preferred proportion is 5 to 15 parts by weight.

The composition containing said fourth component, the amino resin according to the present invention is not suitable for certain applications, such as printing, where coating process is done without heating, because blocking resistance and abrasion resistance will be sacrificed.

In the present invention, a solvent, a surface conditioner, etc. can be incorporated in addition to said first, second, and third components or said first, second, third, and fourth components.

The solvent mentioned above serves to dilute the composition of the invention for improved coatability.

There is no particular limitation on the kind of said solvent but a solvent with a low surface tension is preferred for sufficient wettability. Such solvent includes alcohol series and ketone series solvents and in consideration of the evaporation rate and cost, these solvents can be used in combination with ethyl acetate, butyl acetate, toluene, xylene, etc.

The proportion of the solvent can be increased or decreased as necessary.

There is no particular limitation on the kind of said surface conditioner, thus including fluorine series additives and cellulose series additives. The fluorine series additives reduce the surface tension to enhance wettability so that spattering upon coating on an FRP substrate is prevented. Among the fluorine series additives is Megafac F-177 (Dainippon Ink and Chemicals), for instance.

The cellulose series additives assist in film formation upon coating. Preferred among said cellulose series additives is a high molecular species with a number average molecular weight of not less than 15000 for lowering fluidity, such as cellulose acetate butyrate resin.

In the present invention, an excess of a fluorine series additive detracts from the adhesion to vapor-deposited aluminum and to the top coat. The use of a cellulose series additive in excess decreases the proportion of the solids content in the composition of the invention to lead to poor adhesion of the coating. Therefore, it is advisable to use said fluorine series additive and cellulose series additive in combination.

In the present invention, the proportion of said surface conditioner is preferably 0.01 to 3.0 parts by weight in terms of the total amount of said fluorine series additive and cellulose series additive based on 100 parts by weight of said first, second, and third components combined or said first, second, third, and fourth components combined. When the fluorine series additive alone is employed, the preferred proportion is 0.01 to 1.0 part by weight and when the cellulose series derivative alone is used, the preferred proportion is 0.5 to 5.0 parts by weight.

For the manufacture of an automotive reflector using the composition of the present invention, the FRP molding is first cleaned by aqueous rinse, the composition of the invention is then coated on the surface of the molding, and the coated surface is irradiated with ultraviolet light to provide an under coat or base coat layer.

The above coating can be carried out by, for example, the air spraying method, the electrostatic coating method, or the dip coating method.

The above coating is carried out until a dry film thickness of 10 to 40 μm has been reached and, then, preheated at 70° to 130° C. for 5 to 25 minutes, preferably for 10 to 20 minutes, to evaporate the solvent prior to ultraviolet irradiation. If the preheating temperature is below 70° C., both water resistance and heat resistance will be inadequate. On the other hand, the use of a preheating temperature over 130° C. is uneconomical, although there is no adverse effect on the performance of the coat.

After the above preheating, ultraviolet irradiation is carried out under the condition of about 500 to 5000 mJ. Under this condition, the composition of the present invention is successfully cured.

For the above ultraviolet irradiation, the conventional device in common use in this field of technology, such as a high-pressure mercury lamp, a metal halide lamp, or the like, can be employed.

After the above coating and curing of the composition of the present invention, the objective automotive reflector can be manufactured by vapor-depositing a metal such as aluminum on the cured under coat and, where necessary, applying a clear anticorrosive coating on the deposited metal, and baking the coat at 100° to 120° C. for about 5 to 15 minutes to provide a top coat in a dry film thickness of 3 to 15 μm.

The clear coating that can be used in the above clear coating step includes acrylic lacquer paints, acrylic melamine-curing clear coatings, aluminum chelate-curing acrylic coatings.

The FRP molding to which the composition of the invention can be applied is not limited in kind but includes a variety of motor vehicle reflectors such as head lamp, tail lamp, and blinker reflectors and the composition can be applied most advantageously to head lamps which are required to provide comparatively large light quantities. The composition comprising said first through third components and not containing said fourth component according to the present invention can be applied not only to said automotive reflectors but also to, for example, offset printed paper so as to provide paper products with good adhesion of the offset printing ink and stock printing paper with the additional effect of protecting and decorating the products.

BEST MODE OF PRACTICING THE INVENTION

The following examples are merely intended to describe the present invention in further detail and should by no means be construed as defining the scope of the invention.

Reference Example 1

Synthesis of a tall oil-modified alkyd resin with an oil length of 39%

A reaction flask was charged with 2565 g (8.88 mol) of tall-oil fatty acids and 963 g (6.84 mol) of pentaerythritol and the temperature was increased to 230° C. for a period of 2.5 hours with stirring and constant removal of byproduct water. The reaction mixture was then cooled to 150° C., at which temperature 582 g (4.13 mol) of pentaerythritol and 506 g (8.16 mol) of ethylene glycol were added. Thereafter, 2535 g (17.13 mol) of phthalic anhydride and, as a reflux solvent, 148 g of xylene were added and the temperature was increased to 220° C. for 3 hours with stirring and constant removal of byproduct water until a predetermined acid value had been obtained. After completion of the reaction, the reaction mixture was diluted with 5438 g of xylene to provide a clear tall oil-modified alkyd resin with an acid value of 5, a bubble viscosity of Z2, and an oil length of 39%.

Examples 1 to 6 and Comparative Examples 1 to 3

The various components mentioned in Tables 1 and 2 were mixed in the proportions indicated in parts by weight in Tables 1 and 2 to prepare UV-curing liquid undercoating compositions for metallizing FRP according to Examples and Comparative Examples. The proportions indicated in Tables 1 and 2 represent parts by weight of the solids content.

Referring to Tables 1 and 2, NK Ester ADP-6 Hexa (Shin Nakamura Kagaku Kogyo; dipentaerythritol hexaacrylate) was used as the (meth)acrylate containing 6 (meth)acryloyl groups per molecule (when the number of (meth)acryloyl groups contained per molecule is six, for instance, the compound will hereinafter be referred to sometimes as being hexafunctional). As the mixture of a pentafunctional (meth) acrylate and a hexafunctional (meth)acrylate (hereinafter referred to as 5,6-functional mixture), NK Ester ADP-6 (Shin Nakamura Kagaku Kogyo; a mixture of dipentaerythritol pentaacrylate and dipentaerythritol hexaacrylate) was used. As the mixture of a trifunctional (meth)acrylate and a tetrafunctional (meth)acrylate (hereafter referred to as 3,4-functional mixture), NK Ester ATMM-3L (Shin Nakamura Kagaku Kogyo; a mixture of pentaerythritol triacrylate and pentaerythritol tetraacrylate) was used. As the bifunctional (meth)acrylate, NK Ester APG-200 (Shin Nakamura Kagaku Kogyo; tripropylene glycol diacrylate) was used.

Referring, further, to Tables 1 and 2, Ripoxy VR77 (Showa Polymer Co.; #827, epoxy diacrylate) was used as the epoxy (meth)acrylate. As the urethane (meth)acrylate, the addition product of 2 mols each of 1,5-pentanediol, isophorone diisocyanate and hydroxyethyl acrylate to 1 mole of terahydrophthalic anhydride (Nippon Paint Co.) was used.

Referring, further, to Tables 1 and 2, the oil-midified alkyd resin prepared in Reference Example 1 was used as the tall oil-modified alkyd resin (oil length 39%); Beckosol ET-6502-60 (Dainippon Ink & Chemicals) was used as the tall oil-modified resin (oil length 65%); Beckosol 1323-60-EL (Dainippon Ink & Chemicals) was used as the coconut oil-modified alkyd resin (oil length 28%); Beckosol ES-6505-70 (Dainippon Ink & Chemicals) was used as the soybean oil-modified alkyd resin (oil length 40%); Beckosol OD-E-198-50 (Dainippon Ink & Chemicals) was used as the soybean oil-modified alkyd resin (oil length 28%); Beckosol ES-4020-55 (Dainippon Ink & Chemicals) was used as the soybean-modified alkyd resin (oil length 40%); and Beckosol EL-4501-50 (Dainippon Ink & Chemicals) was used as the linseed oil-modified alkyd resin (oil length 45%). As the sensitizer, Irgacure 651 (Ciba-Geigy; 2,2-dimethoxy-1,2-diphenylethan-1-on) or Kayacure DETX-S (Nippon Kayaku Co.; 2,4-diethylthioxanthone) was used. As the surface conditioner, Megafac F-177 (Dainippon Ink & Chemicals; a perfluoroalkyl group-containing nonionic oligomer) was used. As the solvent, toluene, xylene, and isobutyl alcohol were used in combination.

Fabrication of an FRP automotive reflector

An FRP molding for use as an automotive reflector was washed with isopropyl alcohol (IPA) and dried. Then, each of the UV-curing liquid undercoating compositions for metallizing FRP prepared as above was coated on the surface of the molding by the air spraying method in a dry film thickness of 10 to 20 μm. Therefore, the coated molding was preheated at 100° C. for 10 minutes to evaporate the solvent off and using an ozone type diffusion high-pressure mercury-vapor lamp of 80 W/cm, the coated surface was irradiated with ultraviolet light at an irradiation dose of 3000 mJ for curing to provide an under coat on the FRP molding. Then, aluminum was vapor-deposited on the surface of the under coat and a top coating prepared according the recipe of 20 parts by weight of Upicacoat 3002A (Japan upica), 35 parts by weight of toluene, 40 parts by weight of Solvesso #100, and 5 parts by weight of n-butanol was applied in superimposition by the air spraying method in a dry film thickness of 3 μm and baked at 120° C. for 10 minutes to form a top coating layer and thereby provide an FRP automotive reflector.

Methods for performance evaluation

Each of the FRP automotive reflectors fabricated as above was tested for evaluation of the following performance parameters. The results are set forth in Tables 1 and 2.

1. Appearance of the coat

The appearance of the reflector was visually inspected for defects such as mottle, blushing, cracks, and blisters. The reflectors without defects were rated ○, those with slight defects △, and those with definite defects ×.

2. Gloss

Each reflector was visually evaluated. The reflectors with sufficient gloss were rated ○ and those with insufficient gloss were rated ×.

3. Adhesion

The surface of each reflector was crosshatched with a cutter knife at 2 mm pitches into 100 squares. An adhesive cellophane tape was applied onto the crosshatched surface and rapidly peeled off and the number of unpeeled squares was counted. Samples with an unpeeled square count of 100/100 was rated ○, the one with an unpeeled square count of 99/100 to 91/100 was rated △, and the sample with an unpeeled square count of 90/100 or less was rated ×.

4. Water resistance

Each reflector was immersed in a constant-temperature bath of 40° C. for 30 hours and then taken out. The reflector was wiped gently with a cloth and the appearance and adhesion were evaluated in the same manner as above.

5. Heat resistance

Each reflector was allowed to stand in a hot-air circulation type drying oven at 180° C. for 96 hours and then taken out. After the reflector was allowed to cool to room temperature, the appearance and adhesion were evaluated in the same manner as above.

6. Pot life

Each composition was stored at 40° C. for 3 months and its storage stability was evaluated. The composition showing no remarkable change in viscosity without formation of gels was rated ○ and the composition showing a marked change in viscosity or the formation of gels was rated ×.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 |
| Recipe (parts by weight) | (Meth)-acrylate | 6-functional | 40 | — | — | — | — | — | — | — | — |
| | | 5,6-functional mixture | — | 20 | 30 | 50 | 60 | 50 | 40 | 50 | 60 |
| | | 3,4-functional mixture | — | — | — | — | — | — | — | — | — |
| | | 2-functional | — | — | — | — | — | — | — | — | — |
| | | Epoxy (meth)acrylate | — | — | — | — | — | — | — | — | — |
| | | Urethane (meth)acrylate | — | — | — | — | — | — | — | — | — |
| | Oil-modified alkyd resin | Tall oil-modified, oil length 39% | 60 | 80 | 70 | 50 | 40 | — | — | — | — |
| | | Tall oil-modified, oil length 65% | — | — | — | — | — | — | — | — | — |

TABLE 1-continued

| | | | Example | | | | | | | | |
|---|---|---|---|---|---|---|---|---|---|---|---|
| | | | 1 | 2 | 3 | 4 | 5 | 6 | 7 | 8 | 9 |
| | | Coconut oil-modified, oil length 28% | — | — | — | — | — | 50 | — | — | — |
| | | Soybean oil-modified, oil length 40% | — | — | — | — | — | — | 60 | 50 | 40 |
| | | Linseed oil-modified, oil length 45% | — | — | — | — | — | — | — | — | — |
| | Oil length of solids content of composition (%) | | 23.4 | 31.2 | 27.3 | 19.5 | 15.6 | 14 | 24 | 20 | 16 |
| (parts | | Polyisocyanate | — | — | — | — | — | — | — | — | — |
| by | Sensitizer | Irgacure 651 | 3 | 3 | 3 | — | — | 3 | 3 | 3 | — |
| weight) | | Kayacure DETX-S | — | — | — | 3 | 7 | — | — | — | — |
| | Surface conditioner and solvent | | 156.1 | 156.1 | 156.1 | 156.1 | 156.1 | 156.1 | 156.1 | 156.1 | 156.1 |
| Evaluation | | Appearance of coat | ○ | ○ | ○ | ○ | ○ | ○ | ○ | ○ | ○ |
| | | Gloss | ○ | ○ | ○ | ○ | ○ | ○ | ○ | ○ | ○ |
| | | Adhesion | ○ | ○ | ○ | ○ | ○ | ○ | ○ | ○ | ○ |
| | Water resistance | Appearance | ○ | ○ | ○ | ○ | ○ | ○ | ○ | ○ | ○ |
| | | Adhesion | ○ | ○ | ○ | ○ | ○ | ○ | ○ | ○ | ○ |
| | Heat resistance (180° C.) | Appearance | ○ | ○ | ○ | ○ | ○ | ○ | ○ | ○ | ○ |
| | | Adhesion | ○ | ○ | ○ | ○ | ○ | ○ | ○ | ○ | ○ |
| | | Pot life | ○ | ○ | ○ | ○ | ○ | ○ | ○ | ○ | ○ |

TABLE 2

| | | | Example | | | | | | | Comparative example | | |
|---|---|---|---|---|---|---|---|---|---|---|---|---|
| | | | 10 | 11 | 12 | 13 | 14 | 15 | 16 | 1 | 2 | 3 |
| Recipe | (Meth)- | 6-functional | — | — | — | — | — | — | — | — | — | — |
| (parts | acrylate | 5,6-functional mixture | 40 | 50 | 60 | — | 40 | 40 | 40 | 30 | 40 | 40 |
| by | | 3,4-functional mixture | — | — | — | 50 | — | — | — | — | — | 20 |
| weight) | | 2-functional | — | — | — | — | 10 | — | — | — | — | — |
| | | Epoxy (meth)acrylate | — | — | — | — | — | 10 | — | — | — | — |
| | | Urethane (meth)acrylate | — | — | — | — | — | — | 10 | — | — | — |
| | Oil-modified alkyd resin | Tall oil-modified, oil length 39% | — | — | — | 50 | 50 | 50 | 50 | — | — | — |
| | | Tall oil-modified, oil length 65% | — | — | — | — | — | — | — | 70 | 60 | — |
| | | Coconut oil-modified, oil length 28% | — | — | — | — | — | — | — | — | — | — |
| | | Soybean oil-modified, oil length 40% | — | — | — | — | — | — | — | — | — | — |
| | | Linseed oil-modified, oil length 45% | 60 | 50 | 40 | — | — | — | — | — | — | — |
| | Oil length of solids content of composition (%) | | 22.5 | 22.5 | 22.5 | 19.5 | 19.5 | 19.5 | 19.5 | 45.5 | 39.0 | — |
| (parts | | Polyisocyanate | — | — | — | — | — | — | — | — | — | 30 |
| by | Sensitizer | Irgacure 651 | 3 | 3 | 3 | 3 | 3 | 3 | 3 | 3 | 3 | 3 |
| weight) | | Kayacure DETX-S | — | — | — | — | — | — | — | — | — | — |
| | Surface conditioner and solvent | | 156.1 | 156.1 | 156.1 | 156.1 | 156.1 | 156.1 | 156.1 | 156.1 | 156.1 | 156.1 |
| Evaluation | | Appearance of coat | ○ | ○ | ○ | ○ | ○ | ○ | ○ | x | x | ○ |
| | | Gloss | ○ | ○ | ○ | ○ | ○ | ○ | ○ | x | x | ○ |
| | | Adhesion | ○ | ○ | ○ | ○ | ○ | ○ | ○ | ○ | ○ | ○ |
| | Water resistance | Appearance | ○ | ○ | ○ | ○ | ○ | ○ | ○ | x | x | ○ |
| | | Adhesion | ○ | ○ | ○ | ○ | ○ | ○ | ○ | ○ | ○ | ○ |
| | Heat resistance (180° C.) | Appearance | ○ | ○ | ○ | ○ | ○ | ○ | ○ | x | x | ○ |
| | | Adhesion | ○ | ○ | ○ | ○ | ○ | ○ | ○ | ○ | ○ | ○ |
| | | Pot life | ○ | ○ | ○ | ○ | ○ | ○ | ○ | ○ | ○ | x |

Examples 17 to 30 and Comparative Examples 4 and 5

UV-curing liquid undercoating compositions for metallizing FRP were prepared in the same manner as Example 1 except that 50 parts by weight of the 5,6-functional mixture was used as the compound(s) containing at least two (meth) acryloyl groups per molecule and 50 parts by weight of the tall oil-modified alkyd resin (oil length 39%) obtained in Reference Example 1 as the oil-modified alkyd resin and that the oil length of the solids content was controlled to 19.5%. Then, according to the above method of manufacturing FRP automotive reflectors and performance evaluation methods, automotive reflectors were fabricated and evaluated in the same manner as in Example 1 except that the preheating temperature and time settings shown in Tables 3 and 4 were employed. The results are presented in Tables 3 and 4.

Mitsui Cytech Co.. U-Van 520 is an n-butylated melamine resin manufactured by Mitsui Toatsu Co.; U-Van 20-SE-60 is another n-butylated melamine resin manufactured by

TABLE 3

|  |  | Example | | | | | | | |
|---|---|---|---|---|---|---|---|---|---|
|  |  | 17 | 18 | 19 | 20 | 21 | 22 | 23 | 24 |
| Preheating temperature (°C.) | | 70 | 70 | 80 | 80 | 90 | 90 | 100 | 100 |
| Preheating time (min.) | | 10 | 20 | 10 | 20 | 10 | 20 | 10 | 20 |
| Evaluation | Appearance of coat | ○ | ○ | ○ | ○ | ○ | ○ | ○ | ○ |
|  | Gloss | ○ | ○ | ○ | ○ | ○ | ○ | ○ | ○ |
|  | Adhesion | ○ | ○ | ○ | ○ | ○ | ○ | ○ | ○ |
| Water resistance | Appearance | ○ | ○ | ○ | ○ | ○ | ○ | ○ | ○ |
|  | Adhesion | ○ | ○ | ○ | ○ | ○ | ○ | ○ | ○ |
| Heat resistance (180° C.) | Appearance | ○ | ○ | ○ | ○ | ○ | ○ | ○ | ○ |
|  | Adhesion | ○ | ○ | ○ | ○ | ○ | ○ | ○ | ○ |

TABLE 4

|  |  | Example | | | | | | Comparative Example | |
|---|---|---|---|---|---|---|---|---|---|
|  |  | 25 | 26 | 27 | 28 | 29 | 30 | 4 | 5 |
| Preheating temperature (°C.) | | 110 | 110 | 120 | 120 | 130 | 130 | 60 | 60 |
| Preheating time (min.) | | 10 | 20 | 10 | 20 | 10 | 20 | 10 | 25 |
| Evaluation | Appearance of coat | ○ | ○ | ○ | ○ | ○ | ○ | ○ | ○ |
|  | Gloss | ○ | ○ | ○ | ○ | ○ | ○ | ○ | ○ |
| Water resistance | Appearance | ○ | ○ | ○ | ○ | ○ | ○ | x | x |
|  | Adhesion | ○ | ○ | ○ | ○ | ○ | ○ | x | x |
| Heat resistance (180° C.) | Appearance | ○ | ○ | ○ | ○ | ○ | ○ | x | x |
|  | Adhesion | ○ | ○ | ○ | ○ | ○ | ○ | x | x |

Examples 31 to 45 and Comparative Example 6

Automotive reflectors were fabricated in the same manner as Example 1 except that said 5,6-functional mixture and said tall oil-modified alkyd resin with an oil length of 39% were used in the proportions indicated in Tables 5 and 6 and that the amino resin was used in the proportions shown in Table 5 and 6 and the adhesion and heat resistance (180° C. and 200° C.) were tested as in Example 1. The results are shown in Tables 5 and 6.

Referring to Tables 5 and 6, Cymel 303 is a methylated melamine resin manufactured by Mitsui Cytech Co.; Cymel 350 is another methylated melamine resin manufactured by Mitsui Toatsu Co.; U-Van 2021 is an n-butylated melamine resin manufactured by Mitsui Toatsu Co.; U-Van 220 is an n-butylated melamine resin manufactured by Mitsui Toatsu Co.; U-Van 22R is an n-butylated melamine resin manufactured by Mitsui Toatsu Co.; U-Van 2028 is an n-butylated melamine resin manufactured by Mitsui Toatsu Co.; U-Van 165 is an isobutylated melamine resin manufactured by Mitsui Toatsu Co.; U-Van 114 is an isobutylated melamine resin manufactured by Mitsui Toatsu Co.; U-Van 62 is an isobutylated melamine resin manufactured by Mitsui Toatsu Co.; U-Van 60R is an isobutylated melamine resin manufactured by Mitsui Toatsu Co.; and MF-521 Varnish is a benzoguanamine resin manufactured by Nippon Paint Co.

TABLE 5

|  |  |  | Example | | | | | | | |
|---|---|---|---|---|---|---|---|---|---|---|
|  |  |  | 31 | 32 | 33 | 34 | 35 | 36 | 37 | 38 |
| Recipe (parts by weight) | | 5,6-functional mixture | 50 | 50 | 50 | 50 | 50 | 50 | 50 | 50 |
|  | | Tall oil-modified alkyd resin (oil length 39%) | 50 | 50 | 50 | 50 | 50 | 50 | 50 | 50 |
|  | Amino resin | U-Van 520 | 5 | 10 | 15 | — | — | — | — | — |
|  |  | U-Van 20SE60 | — | — | — | 5 | 10 | — | — | — |
|  |  | U-Van 2021 | — | — | — | — | — | 10 | — | — |
|  |  | U-Van 220 | — | — | — | — | — | — | 10 | — |
|  |  | U-Van 22R | — | — | — | — | — | — | — | 10 |
|  |  | U-Van 2028 | — | — | — | — | — | — | — | — |
|  |  | U-Van 165 | — | — | — | — | — | — | — | — |
|  |  | U-Van 164 | — | — | — | — | — | — | — | — |

TABLE 5-continued

|  |  | Example | | | | | | | |
|---|---|---|---|---|---|---|---|---|---|
|  |  | 31 | 32 | 33 | 34 | 35 | 36 | 37 | 38 |
|  | U-Van 62 | — | — | — | — | — | — | — | — |
|  | U-Van 60R | — | — | — | — | — | — | — | — |
|  | Cymel 303 | — | — | — | — | — | — | — | — |
|  | MF-521 Varnish | — | — | — | — | — | — | — | — |
|  | Sensitizer: Irgacure 651 | 3 | 3 | 3 | 3 | 3 | 3 | 3 | 3 |
|  | Surface conditioner and solvent | 156.1 | 156.1 | 156.1 | 156.1 | 156.1 | 156.1 | 156.1 | 156.1 |
| Evaluation | Appearance of coat | ○ | ○ | ○ | ○ | ○ | ○ | ○ | ○ |
| Heat resistance (180° C.) | Appearance | ○ | ○ | ○ | ○ | ○ | ○ | ○ | ○ |
|  | Adhesion | ○ | ○ | ○ | ○ | ○ | ○ | ○ | ○ |
| Heat resistance (200° C.) | Appearance | ○ | ○ | ○ | ○ | ○ | ○ | ○ | ○ |
|  | Adhesion | ○ | ○ | ○ | ○ | ○ | ○ | ○ | ○ |

TABLE 6

|  |  |  | Example | | | | | | | Comparative Example |
|---|---|---|---|---|---|---|---|---|---|---|
|  |  |  | 39 | 40 | 41 | 42 | 43 | 44 | 45 | 6 |
| Recipe (parts by weight) |  | 5,6-functional mixture | 50 | 50 | 50 | 50 | 50 | 50 | 50 | 50 |
|  |  | Tall oil-modified alkyd resin (oil length 39%) | 50 | 50 | 50 | 50 | 50 | 50 | 50 | 50 |
|  | Amino resin | U-Van 520 | — | — | — | — | — | — | — | 25 |
|  |  | U-Van 20SE60 | — | — | — | — | — | — | — | — |
|  |  | U-Van 2021 | — | — | — | — | — | — | — | — |
|  |  | U-Van 220 | — | — | — | — | — | — | — | — |
|  |  | U-Van 22R | — | — | — | — | — | — | — | — |
|  |  | U-Van 2028 | 10 | — | — | — | — | — | — | — |
|  |  | U-Van 165 | — | 10 | — | — | — | — | — | — |
|  |  | U-Van 164 | — | — | 10 | — | — | — | — | — |
|  |  | U-Van 62 | — | — | — | 10 | — | — | — | — |
|  |  | U-Van 60R | — | — | — | — | 10 | — | — | — |
|  |  | Cymel 303 | — | — | — | — | — | 5 | — | — |
|  |  | MF-521 Varnish | — | — | — | — | — | — | 5 | — |
|  | Sensitizer: Irgacure 651 |  | 3 | 3 | 3 | 3 | 3 | 3 | 3 | 3 |
|  | Surface conditioner and solvent |  | 156.1 | 156.1 | 156.1 | 156.1 | 156.1 | 156.1 | 156.1 | 156.1 |
| Evaluation | Appearance of coat |  | ○ | ○ | ○ | ○ | ○ | ○ | ○ | x |
|  | Heat resistance (180° C.) | Appearance | ○ | ○ | ○ | ○ | ○ | ○ | ○ | ○ |
|  |  | Adhesion | ○ | ○ | ○ | ○ | ○ | ○ | ○ | x |
|  | Heat resistance (200° C.) | Appearance | ○ | ○ | ○ | ○ | ○ | ○ | ○ | ○ |
|  |  | Adhesion | ○ | ○ | ○ | ○ | ○ | ○ | ○ | x |

It will be apparent from the data presented in Tables 1 through 6 that the composition of the present invention is excellent in appearance, gloss, water resistance, and storage stability and, where it contains an amino resin, shows sufficiently high heat resistance even at 200° C.

When the composition not containing an amino resin was applied to poorly molded FRP substrates, the evaluation of appearance revealed pop-ups after 96 hours at 180° C. and even when the normally molded FRP substrate was employed, the appearance was poor after 96 hours at 200° C. In contrast, with the composition containing an amino resin, a good appearance was retained under the same conditions.

INDUSTRIAL APPLICABILITY

Since the composition of the present invention comprises specified proportions of a compound(s) containing at least two (meth)acryloyl groups per molecule, oil-modified alkyd resin(s), amino resin, and sensitizer, it can be used advantageously as an UV-curable under coat for metallizing FRP which is of the one-component type, i.e. virtually free from the limited pot life, insuring a good appearance with sufficiently high heat resistance and water resistance, high adhesion. When used for the manufacture of FRP automotive reflectors, the composition contributes to the formation of a vapor-deposited metal film with good metallic gloss, adhesion, and heat resistance. In the printing field, the composition protects printing paper and imparts a decorative effect.

We claim:

1. An ultraviolet-curing liquid undercoating composition for metallizing fiber-reinforced plastics (FRP) which comprises 20 to 80 parts by weight of a compound(s) containing at least two (meth)acryloyl groups per molecule, 80 to 20 parts by weight of oil-modified alkyd resin(s), and 2 to 15 parts by weight of a sensitizer, based on 100 parts by weight of said compound(s) containing at least two (meth)acryloyl groups per molecule and said oil-modified alkyd resin(s).

2. An ultraviolet-curing liquid undercoating composition for metallizing fiber-reinforced plastics (FRP) which comprises
   20 to 80 parts by weight of a compound(s) containing at least two (meth)acryloyl groups per molecule,
   80 to 20 parts by weight of oil-modified alkyd resin(s),
   2 to 15 parts by weight of a sensitizer, based on 100 parts by weight of said compound(s) containing at least two (meth)acryloyl groups per molecule and said oil-modified alkyd resin(s), and
   5 to 20 parts by weight of an amino resin, based on a combined total of 100 parts by weight of said compound(s) containing at least two (meth)acryloyl groups per molecule and said oil-modified alkyd resin(s).

3. The ultraviolet-curing liquid undercoating composition for metallizing fiber-reinforced plastics (FRP) according to claim 1 wherein said compound(s) containing at least two (meth)acryloyl groups per molecule is a compound(s) containing three or more (meth)acryloyl groups per molecule.

4. The ultraviolet-curing liquid undercoating composition for metallizing fiber-reinforced plastics (FRP) according to claim 1 wherein said oil-modified alkyd resin(s) is alkyd resin(s) modified by at least one member selected from the group consisting of tall oil, coconut oil, soybean oil, safflower oil, linseed oil, tung oil, castor oil, and fatty acids available from said oils.

5. The ultraviolet-curing liquid undercoating composition for metallizing fiber-reinforced plastics (FRP) according to claim 1 wherein the oil length of the solids content of said composition is not greater than 35%.

6. A coating method using the ultraviolet-curing liquid undercoating composition for metallizing fiber-reinforced plastics (FRP) according to claim 1 which comprises applying the UV-curing liquid undercoating composition for metallizing fiber-reinforced plastics (FRP) to the surface of a molded fiber-reinforced plastics (FRP) substrate in a dry film thickness of 10 to 40 μm, preheating the coated surface at a temperature of 70° to 130° C. for 5 to 25 minutes, and thereafter irradiating the surface with 500 to 5000 mJ of ultraviolet light.

7. An automotive reflector which comprises an fiber-reinforced plastics (FRP) substrate, an undercoating layer of the ultraviolet-curing liquid undercoating composition for metallizing fiber-reinforced plastics (FRP) formed and cured on the surface of the molded FRP by the coating method according to claim 6, a vapor-deposited metal layer superimposed thereon, and a top coating layer formed on said metal layer in a dry thickness of 3 to 15 μm.

8. The ultraviolet-curing liquid undercoating composition for metallizing fiber-reinforced plastics (FRP) according to claim 2 wherein said compound(s) containing at least two (meth)acryloyl groups per molecule is a compound(s) containing three or more (meth)acryloyl groups per molecule.

9. The ultraviolet-curing liquid undercoating composition for metallizing fiber-reinforced plastics (FRP) according to claim 2 wherein said oil-modified alkyd resin(s) is alkyd resin(s) modified by at least one member selected from the group consisting of tall oil, coconut oil, soybean oil, safflower oil, linseed oil, tung oil, castor oil, and fatty acids available from said oils.

10. The ultraviolet-curing liquid undercoating composition for metallizing fiber-reinforced plastics (FRP) according to claim 2 wherein the oil length of the solids content of said composition is not greater than 35%.

11. A coating method using the ultraviolet-curing liquid undercoating composition for metallizing fiber-reinforced plastics (FRP) according to claim 2 which comprises applying the UV-curing liquid undercoating composition for metallizing fiber-reinforced plastics (FRP) to the surface of a molded fiber-reinforced plastics (FRP) substrate in a dry film thickness of 10 to 40 μm, preheating the coated surface at a temperature of 70° to 130° C. for 5 to 25 minutes, and thereafter irradiating the surface with 500 to 5000 mJ of ultraviolet light.

12. The ultraviolet-curing liquid undercoating composition for metallizing fiber-reinforced plastics (FRP) according to claim 2 wherein said amino resin is at least one kind selected from the group consisting of
   methylolated amino resins which are synthesized by using at least one of melamine, urea, and benzoguanamine, and a formaldehyde, and
   such methylolated amino resins whose methylol groups are totally or partly etherified with lower monohydric alcohols.

* * * * *